Feb. 5, 1952     G. A. LYON     2,584,142
WHEEL COVER
Filed Dec. 20, 1946     2 SHEETS—SHEET 2
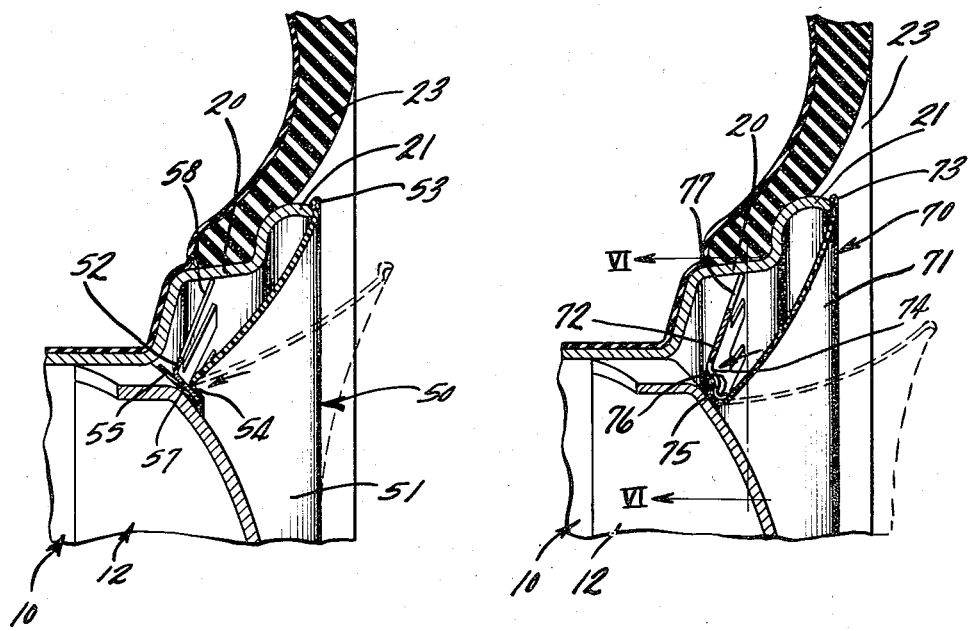
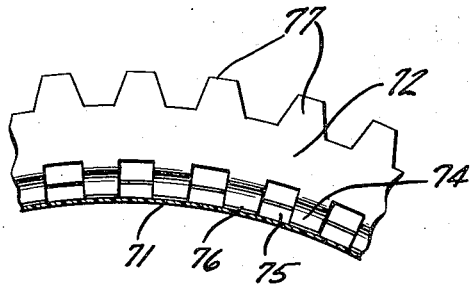
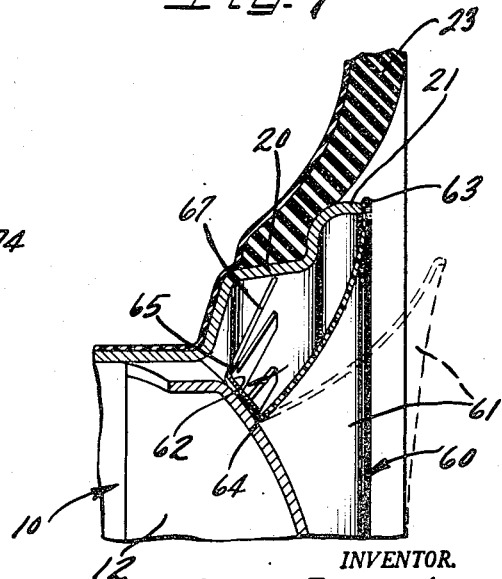
INVENTOR.
GEORGE ALBERT LYON
BY
The Firm of Charles W. Hills
ATTYS.

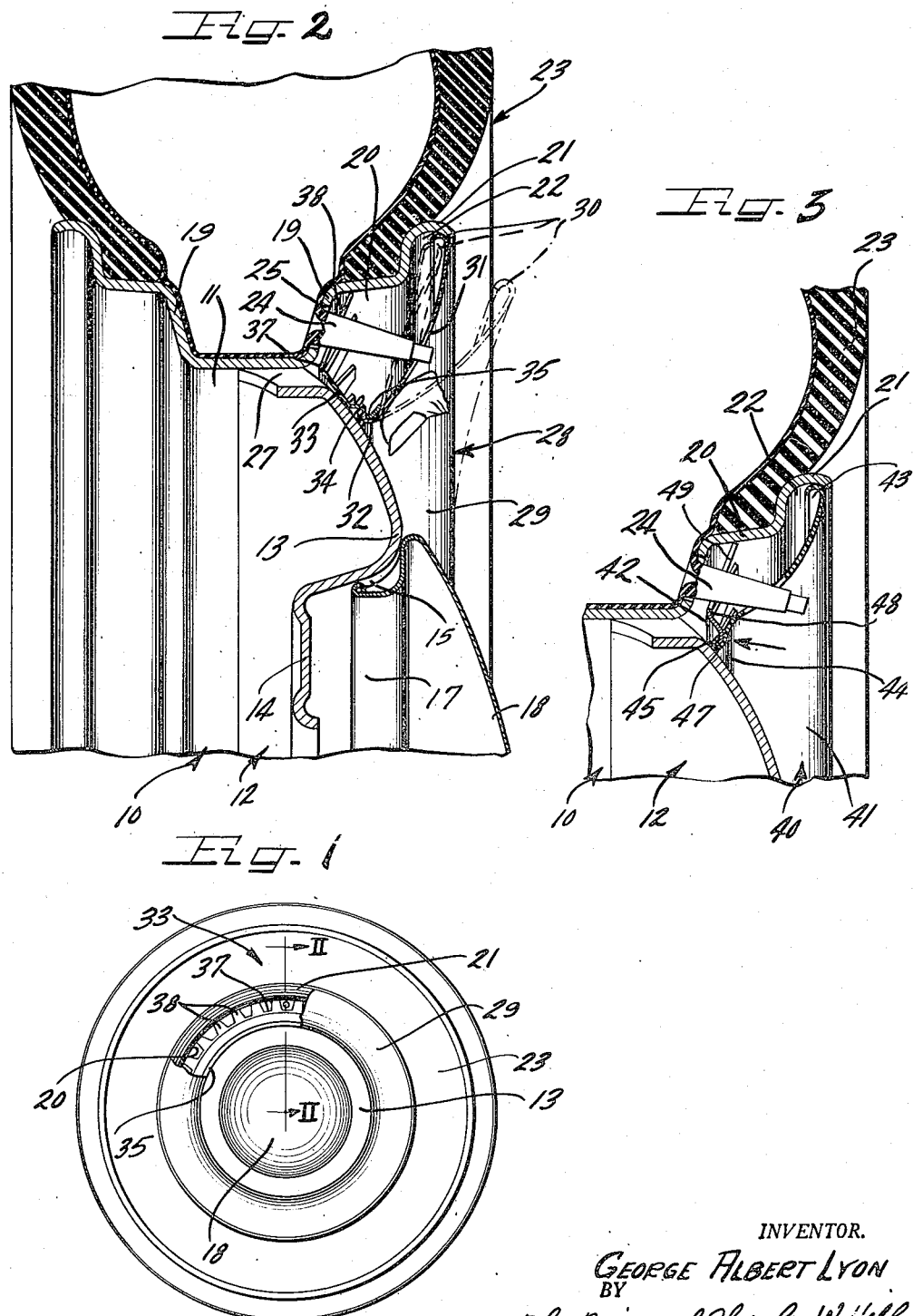

Patented Feb. 5, 1952

2,584,142

UNITED STATES PATENT OFFICE 2,584,142

WHEEL COVER

George Albert Lyon, Allenhurst, N. J.

Application December 20, 1946, Serial No. 717,347

12 Claims. (Cl. 301—37)

This invention relates to wheel structures and is directed more particularly to improvements in cover assemblies therefor.

The present application is a continuation-in-part of applicant's copending application Serial No. 479,702, filed March 19, 1943 now Patent Number 2,415,829.

An object of the invention is to provide a novel trim ring type of cover for a wheel having a multi-flanged tire rim to be covered and wherein the cover is secured to the wheel in such a manner as to adapt the cover to be pressed into position on the wheel and will then be retained securely against accidental displacement.

Another object of the invention is to provide a novel means for securing a cover to a wheel including a multi-flanged tire rim and a load-sustaining body part.

Still another object of the invention is to provide an improved cover assembly for an automobile wheel or the like and including a resiliently deflectable cover member which may be formed from synthetic plastic held in assembly with the wheel by means of a metal retaining ring assembled therewith in a novel manner and holding the same in position in such a manner as to enable opening flexure of the cover for access therebehind.

A still further object of the invention is to provide a novel trim ring type of cover assembly wherein a relatively flexible trim ring member is held in place on a wheel by means of a retaining ring having retaining engagement with a multi-flanged tire rim concealed by the trim ring and retains the trim ring in concealing relation to the tire rim and the juncture of the tire rim and a load-sustaining body part.

In accordance with the general features of the invention, there is provided in combination with a wheel structure including a multi-flanged tire rim and a load-sustaining body part, a cover assembly including a cover member formed to be disposed in concealing relation to the tire rim and having a generally radially inward and axially inward curvature in general simulation of the side wall of a tire carried by the rim so as to appear in service, and when of a light or white color as the radially inner white side wall portion of a massive tire, and a retaining ring interconnected with the inner margin of the cover member and having pressed-on engagement with the tire rim, the inner margin of the cover member being turned back upon itself to provide a groove into which an inner marginal portion of a retaining ring is engaged.

According to another feature of the invention there is provided in conjunction with a wheel including a multi-flanged tire rim and a load-sustaining body part and wherein the tire rim has an extremity flange providing a generally radially inwardly opening groove, a cover, for the tire rim and the juncture of the rim and body part, formed from resiliently deflectable material and having an outer circular margin turned generally axially inwardly and nesting within said tire rim groove, with the body of the cover extending generally radially and axially inwardly on a convex cross sectional contour whereby to simulate an inward extension of a tire side wall of a tire supported by the tire rim, the outer margin of the cover being adapted to be pried out of or dislodged by manipulation from engagement with the tire rim flange groove for opening or releasing the cover.

According to still another feature of the invention, the wheel cover is in the form of an annulus formed at its outer margin with a flange curved in cross section adapted to seat within a terminal flange groove in a multi-flanged tire rim, and having the inner margin thereof turned axially inwardly and radially outwardly to provide a grooved retaining flange structure receptive of radially inner marginal retaining means on a retaining ring extending generally radially outwardly behind the cover and retained in place in such a manner that the cover can be pried free from the rim flange at its outer margin and flexed open in any local area thereof and will then substantially return to the assembled relationship with the wheel when released from the flexure.

According to yet additional features of the invention, a trim ring is provided for covering the outer side of a tire rim and the juncture thereof with a wheel body, the inner margin of the trim ring being turned under and being engaged by a retaining ring which holds the trim ring in place with respect to the wheel body, the trim ring being formed from resiliently deflectable material, and the underturned inner margin thereof affording a reinforcement backed up by said trim ring for flexing the trim ring open by generally axially outward flexure thereof from any selected point along its outer periphery.

Other objects, features and advantages of the present invention will be readily apparent from the following detailed description of certain preferred embodiments thereof taken in connection with the accompanying drawings wherein:

Fig. 1 is a side elevational view of a wheel structure showing a cover assembly embodying the features of the invention partly broken away to reveal details of the assembly;

Fig. 2 is a fragmentary radial sectional view on an enlarged scale substantially along the line II—II of Fig. 1;

Fig. 3 is a radial sectional view taken substantially in the same plane as Fig. 2 but showing a modified form of cover assembly;

Fig. 4 is a similar radial sectional view showing a further modified form of the cover assembly;

Fig. 5 is another similar radial sectional view showing a still further modified form of the invention;

Fig. 6 is a fragmentary sectional elevational view taken substantially along the line VI—VI of Fig. 5, and showing details of the retaining ring structure, and Fig. 7 is a view similar to Fig. 4 showing a further slightly modified form of the cover assembly.

As shown on the drawings:

In Figs. 1 and 2, a drop center type of multi-flanged tire rim 10 formed with a base flange 11 is supported by a load-sustaining or body part 12. The latter is secured to the base flange 11 and is formed with an intermediate annular axially outwardly protruding reinforcing nose portion 13 defining a central dished area providing a bolt-on flange 14 by which the wheel is adapted to be secured by means as cap screws or bolts (not shown) to a part of the axle of a vehicle. Means such as retaining bumps 15 formed at the radially inner side of the reinforcing hump 13 are adapted to be engaged by an axially inwardly extending beaded flange 17 of a hub cap 18.

In addition to the base flange 11, the tire rim 10 has side flanges 19 extending from the base flange, intermediate generally axially extending and slightly radially outwardly slanting intermediate flanges 20, and terminal flanges 21 which may have their extremities, or at least the outer of which may have its extremity curled slightly radially inwardly whereby a radially inwardly opening annular groove 22 is provided. Within the stepped channel provided by the tire rim 10 is adapted to be supported a tire and tube assembly 23, the tube being provided with a valve stem 24 which extends through a valve stem aperture 25 formed in the axially outer side flange 19.

Both the tire rim 10 and the wheel body 12 may be formed from suitable sheet metal appropriately stamped or rolled to shape. The stepped flange formation of the tire rim 10, and ventilation openings 27 formed between the wheel body 12 and the tire rim base flange 11, present an inherently rather unattractive appearance and provide grooves and recesses which are dirt catching, thus further detracting from the appearance of the wheel in service.

According to the present invention, the outer side of the tire rim 10 and the juncture thereof with the wheel body 12 are ornamentally covered by a novel cover assembly 28. This cover assembly comprises as a principal component an annular outer cover portion or trim ring member 29 which is preferably formed from resiliently flexible material such as a synthetic plastic of relatively thin sheet form and of such resilient flexibility that any portion of the cover member may be flexed substantially normal to its plane, and by appropriate manipulation for some purposes deflected at least to a limited extent in local areas in general direction of its plane and caused to buckle by manipulation, but will of its own resiliency promptly and accurately return to the initial, determined shape or finished contours upon release of the deflectional flexure or buckling manipulative forces and pressures. For this purpose I have found a synthetic plastic sheet material such as ethyl cellulose, cellulose acetate, vinyl resins and the like particularly satisfactory.

In addition to serving as a covering for the tire rim 10 and the juncture thereof with the wheel body, the cover member 29 is preferably so shaped and of such external appearance that in use it serves in simulation of a radially inwardly extending continuation of the side wall of the tire 23. To this end, the cover member 29 is formed on a generally convex curvature in cross section extending generally radially inwardly and axially inwardly, the width of the cover member being such as to extend from the tire rim terminal flange 21 at its outer margin to the wheel body 12 adjacent to the radially outer base portion of the reinforcing nose 13, and spaced radially inwardly from the juncture of the tire rim and the wheel body. By having the cover member 29 of a light eggshell or white color, it strongly resembles a radially inward side wall extension of the tire.

At its outer margin, the cover member 29 is preferably formed with an axially inwardly curled marginal reinforcing flange 30 of a circumference to fit in snap-on relation within the tire rim marginal flange groove 22. In view of the cross sectional curvature of the marginal flange 30 it can be readily cammed past the smaller diameter lip edge of the tire rim terminal flange 21, by appropriate manipulation for assembling the cover with wheel. For removing the cover, a pry-off tool may be forcibly inserted between the lip of the rim flange 21 and the curled outer marginal cover flange 30, or the cover may be resiliently deflected inwardly as shown in dash outline in Fig. 2 to draw the cover flange radially inwardly away from the opposing surface of the groove 22 in the area of the transverse flexure, for manual or tool engagement to pull or force the deflected outer marginal portion axially outwardly and cam the remainder of the flange around its circumference free.

By having the initial circumference of the curled outer marginal flange 30 slightly greater than the maximum diameter of the groove 22, a tight tensioned assembly of the outer margin of the cover is attained within the groove. The curled flange 30, by reason of the inherent resiliency of the material, curls upon itself to the extent necessary for conformance to the groove diameter. This is an especially desirable feature for adapting the cover to a substantial range of manufacturing tolerance both in the formation of the tire rim flange 21 and the cover outer marginal flange 30.

Transverse inward flexure as shown in dash outline in Fig. 2 is also of value in affording access clearance to the tip of the valve stem 24 which may conveniently project through an aperture 31 provided therefor in the cover member 29.

At its inner margin, the cover member 29 is reinforced with a return bent generally axially inwardly and radially outwardly extending flange 32 which provides a generally radially outwardly opening groove therein of substantially V-form, utilized in the present instance for the reception therein of additional retaining means for the cover. Herein such retaining means comprises a ring-shaped sheet metal retainer 33 having the body thereof disposed in a generally conical plane extending axially inwardly and radially outwardly from a generally axially outwardly extending inner marginal flange 34. An annular radially inwardly projecting bead 35 on the flange 34 is generally complementary to the groove provided by the inner marginal cover reinforcing flange 32 and internested therewith in assembly.

At its outer margin, the retainer ring 33 is formed with a narrow annular divergent, generally radially outwardly and axially outwardly extending reinforcing flange 37 from which project radially outwardly and axially outwardly extending retaining fingers 38. The fingers are formed in a uniform peripheral series and have the tips thereof on a diameter slightly greater than the intermediate inside diameter of the adjacent intermediate flange 20 of the tire rim for effecting a wedging, biting retaining engagement therewith.

In assembling the cover member 29 with the retaining ring 33, the inner marginal reinforcing and interengaging flange 32 of the cover member is adapted to be flexibly manipulated into internested, retaining engagement with the retaining bead 35 of the retainer, and the unitary assembly thus effected, is then adapted to be mounted on the wheel by pressing the same axially inwardly into the relatively large annular groove defined between the outer side of the tire rim and the wheel body. For this purpose, a finger pressure is exerted, substantially as shown in Fig. 2, at appropriately spaced points, axially inwardly against the inner marginal portion of the cover member 29 backed up by the retaining bead 35, until the body of the retaining ring 33 bears against the wheel body and the retaining fingers 38 have entered fully into the wedging, biting engagement with the intermediate tire rim flange 20 for holding the retaining ring more or less permanently in place. Thereupon, the outer peripheral curled flange 30 of the cover member is adapted to be seated within the tire rim groove 22. As a result, the cover 29 is quite effectively held in place on the wheel.

Should it be necessary to gain access behind the cover 29 that may easily be effected by dislodging the outer peripheral retaining bead 30 from the tire rim groove 22 and flexing the cover transversely outwardly more or less normal to its plane substantially as shown in dot-dash outline in Fig. 2. If it becomes necessary to replace the cover 29, that can be accomplished with dispatch by dislodging the cover from the retained engagement at its outer periphery with the tire rim and then flexibly disengaging the inner hood-shaped reinforcing flange 32 from the retaining ring bead 35. The cover, or a replacement cover, can then be conveniently re-assembled upon the retaining bead 35 by flexibly manipulating it into place. If it becomes necessary to remove the retaining ring 33 that can be accomplished by prying enough of the series of retaining fingers 38 free from the tire rim flange 20 to dislodge the retaining ring.

In the modified form of the invention shown in Fig. 3, the details of the wheel are identical with those shown in Figs. 1 and 2. In this form, however, a slightly different cover assembly 40 is used wherein a trim ring or cover member 41 is retained in place at its inner margin by a retaining ring 42 and at its outer margin by the internesting of an outer marginal curled reinforcing and retaining flange 43 nesting within the groove 22 of the tire rim terminal flange.

The cover member 41 is preferably formed from a resiliently flexible material such as sheet plastic similarly as the cover member in the form of Figs. 1 and 2. The external shape of the cover member 41 is of a generally convex cross section simulative of a radially inward continuation of the side wall of the tire 23 and it may be of a light or white color so as to appear as a radially inner white side wall portion of the tire.

At its inner margin the cover member 41 is reinforced by an annular, undulant cross section rib formation 44 terminating in an inturned generally radially outwardly extending flange 45 which, with the rib formation 44 provides a groove receptive of a generally radially and axially inwardly extending inner marginal flange 47 on the retaining ring 42.

The body of the retaining ring 42 extends generally radially outwardly and axially inwardly from the retaining flange 47. It has an outer marginal generally radially outwardly extending divergent reinforcing flange 48 from which extend radially outwardly and axially outwardly projecting retaining fingers 49 adapted for wedging biting engagement with the tire rim intermediate flange 20.

In assembling the cover member 41 with the retaining member 42, the inner marginal rib and flange formation 44, 45, is assembled interlockingly by appropriate flexing manipulation thereof with the relatively rigid retaining flange 47. Thereupon the cover assembly 40 is adapted to be mounted on the wheel by disposing it in general concentricity with the groove in the wheel between the tire rim flange and the wheel body and by exerting pressure axially inwardly substantially as indicated by the arrow, against the inner marginal cover bead formation 44 which is backed up and reinforced by the retaining flange 47. The retaining fingers 49 are thus forced into wedging, biting engagement with the tire rim flange 20.

When the cover assembly 40 is in fully mounted relation to the wheel, the inner marginal rib and flange formation 44, 45 of the cover member is clamped against the wheel body by the inner edge of the retaining flange 47. The outer marginal curled flange 43 is of course manipulated into assembly with the tire rim terminal flange 21 by resiliently and deflectionally camming it into the groove 22.

When desired, the flange 43 can be readily pried free or deflectionally disengaged from the tire rim flange 21 and can be flexed open freely on the same manner as described in connection with the flange 30 of the cover member 29, the retaining member 42 affording an inner marginal reinforcement and backing for the cover member 41 relieving it from undue bending stresses or strains.

In the modification of Fig. 4, the wheel structure may be identical with the previously described forms of the invention and a modified cover assembly 50 ornamentally conceals the tire rim 10 and the juncture with the tire rim with the wheel body 12. In this form the cover assembly comprises an annular cover member or trim ring 51 and a retaining member 52 in the form of a ring which is concealed behind the cover member 51.

By preference, the cover member 51 is formed from resiliently flexible material such as sheet plastic which may be of light color or externally colored white and is of generally convex cross section so as to simulate a radially inner white side wall extension of the tire 23. At its outer margin, the cover member 51 is formed with a generally axially inwardly extending reinforcing bead 53 which is of a diameter to encircle the outer edge of the terminal flange 21 of the tire rim. In this form, it will be observed, the outer margin of the cover member 51 merely rests against the edge of the rim 21 and is held thereagainst by a slight tensioned relationship developed by the manner in which the cover member 51 is retained in place by the retaining ring 52.

At its inner margin, the cover member 51 is formed with a generally radially inwardly and axially outwardly extending divergent reinforcing flange 54 which is turned back and under to provide a terminal flange section 55 extending generally parallel to the reinforcing flange 54 axially inwardly and radially outwardly. The flange section is adapted to bear against the wheel body 12 and provides a seat for a radially inwardly and axially outwardly extending inner marginal flange portion 57 of the retaining member which fits nestingly within the groove formed between the flange portions 54 and 55.

From the retaining flange 57 of the retaining ring 52 extend generally radially outwardly and axially outwardly marginal retaining fingers 58 which are adapted for wedging, biting retaining engagement with the tire rim intermediate flange 20.

In assembling the cover member 51 with the retaining ring member 52, the inner marginal flange portions 54 and 55 are flexibly manipulated to assemble the same with the retaining flange 57. The cover assembly 50 thus effected is then disposed generally concentrically within the groove between the tire rim flange and the wheel body and pressed axially inwardly by pressure applied substantially as indicated by the arrow against the cover flange portion 54 which is backed up by the retaining flange 57, until the retaining fingers 58 are in full wedging, biting engagement with the tire rim flange 20 and the retaining ring flange 57 clamps the cover flange portion 55 against the wheel body. By preference, the cover flange portion 55 and the clamping, retaining flange 57 of the retaining ring are disposed substantially parallel to the engaged portion of the wheel body whereby broad and quite effective clamping of the flange portion 55 is effected.

Whenever it is desired, the cover member 51 can be flexed open by engaging the outer marginal bead portion 53 thereof and transversely deflecting the cover member outwardly generally normal to its plane by flexing or bending the inner marginal portion of the cover in the area adjacent to the reinforcing flange 54 substantially as shown in broken outline.

The form of cover assembly shown in the modification of Fig. 7, identified generally by the numeral 60, is in most respect like the cover assembly of Fig. 4. In the modification of Fig. 7, the cover assembly 60 comprises a cover member 61 and a retaining ring 62. The cover member 61 may be formed from resiliently flexible material such as sheet plastic, similarly as the cover members of the forms of the invention already described and is preferably light in color and has a generally tire side wall simulating shape, extending from the tire rim terminal flange 21 to the wheel body 12. An outer marginal reinforcing bead formation 63 overlaps and encircles the edge of the tire rim terminal flange 21.

An inner marginal generally radially outwardly and axially inwardly extending reinforcing flange 64 on the cover member 61 bears flatwise against the body member 12 and is retained in place by the retaining ring 62 which is disposed in complementary plane and bears flatwise against the flange 64 to clamp it against the wheel body.

At its outer margin, the retaining ring 62 is formed with a generally radially outwardly and axially outwardly extending divergent reinforcing flange 65 having similarly extending peripheral wedging, biting, retaining fingers 67 engaging the radial inwardly facing surface of the tire rim intermediate flange 20.

The arrangement of the wedging, biting fingers 67 is such that the retaining ring 62 with the cover member 61 assembled therewith as a unitary cover assembly is adapted to be pressed axially inwardly into place within the relatively large groove formed between the tire rim and the wheel body, by pressure exerted inwardly against the retaining ring substantially as indicated by the directional arrow, and with the cover member 61 deflected open substantially as shown in broken outline. When the retaining ring 62 has been forced into fully seated, retaining relation with the wheel, the cover member 61 is allowed to snap back of its own resilience into symmetrical covering relation to the tire rim, the retaining ring 62 and the juncture of the tire rim with the wheel body.

Since the cover member 61 is flexibly resilient, the flange 64 thereof is adapted to be assembled with the relatively more rigid retaining ring 62 by flexible manipulation and since the flange is disposed in substantially V-convergence with the body of the cover member, the V-groove within which the retaining ring 62 fits provides a substantially interlocked relationship enabling the cover member and the retaining ring to be handled as a unit. When the cover member 61 is deflected open for access therebehind the inner marginal portion thereof bends freely resiliently adjacent to the flange 64 which is reinforced and clamped by the retaining ring 62.

In the modification of Figs. 5 and 6 a cover assembly 70 is provided in which a cover member 71 is secured in mounted relation to the wheel by means of a retaining ring 72 having a flexible clamping engagement with the cover member. The cover assembly 70 is adapted to be used with a wheel structure of the same general style as already described and similar reference numerals therefore identify like elements.

The cover member 71 is preferably formed from a thin resilient sheet material such as synthetic plastic sheet, and like the various other forms of the cover already described, is shaped in cross section to be generally simulative of a radially inward continuation of the tire side wall and is preferably of a light color or colored white to give the appearance of a radially inner white side wall portion of the tire. An outer marginal reinforcing bead 73 interfits closely with the edge of the tire rim marginal flange 21.

Interengagement of the cover member 71 and the retaining ring 72 is effected by the nested interlocked engagement of rounded, more or less resilient, retaining fingers 74 extending generally radially inwardly from the inner margin of the retaining ring and an inner marginal generally axially inwardly and radially outwardly turned rounded reinforcing flange 75 on the cover member providing a generally V-shaped groove within which fit turned back retaining pads 76 at the extremities of the fingers 74. The retaining fingers 74 are formed in a uniform annular series and serve to clamp the reinforcing flange 74 of the cover resiliently against the wheel body when the retaining ring is pressed inwardly, as indicated by the directional arrow, into the groove provided between the tire rim and the wheel body.

Generally radially outwardly and axially outwardly extending wedging biting fingers 77 are provided for engagement with the intermediate flange 20 of the tire rim. In this instance, the body of the retaining ring 72 extends generally in a plane with the retaining fingers 77, whereby the inward wedging pressure of the retaining ring is thoroughly effective in holding the inner retaining fingers 74 under cover-clamping tension.

By reason of the resilient flexibility of the material of the cover 71, the inner marginal hook flange 74 is adapted to be assembled with the retaining fingers 74 on the retaining ring by appropriate flexing manipulation of the cover flange and the cover member and the assembly can then be handled as a complete cover unit. Moreover by reason of the resilient flexibility of the cover 71, it can be deflected substantially as shown in broken outline in Fig. 5 for convenient access to the axially outer side of the retaining ring 72 for application of axially inward push-on pressure thereto in mounting the cover on the wheel. Upon release of the opening flexure thereof, the cover member 71 promptly snaps back to its original shape and provides an attractive ornamental, symmetrical cover for the outer side of the tire rim, the juncture of the tire rim and wheel body, and the retaining ring 72 which is fully concealed therebehind.

When access behind the cover member 71 is desired any local or segmental portion thereof may be pulled open generally axially outwardly by deflecting the same outwardly, the reinforcing inner marginal flange 75 and the reinforcement and back-up therefor provided by the retaining fingers 74 serving to maintain the inner margin of the cover against undue flexure strain and assuring that the cover will retain its position and also that it will return instantaneously to its original contour upon release of the deflecting pull or force. Inward deflection of the cover member 71 also finds the marginal reinforcement thereof advantageous both to save the same from undue resiliently deflectional strains and possible breakage and to improve the rebound resilience thereof.

It is apparent that at least certain of the described embodiments of the invention, although described as particularly adapted to be made from synthetic plastic material, are likewise adapted to be made from thin, resilient sheet metal. Where the cover is formed from sheet metal, as in the forms shown in Figs. 2 and 3, where the outer margin of the annular cover member is adapted for nested engagement within the groove provided by the terminal flange on the tire rim, attachment and detachment of such outer marginal flange structure of the cover member is adapted to be accomplished by transverse inward flexure of the cover member when the first circumferential part of the peripheral flange is pried away from the terminal flange. Thereafter the remaining part of the periphery of the cover may be slidingly disengaged from behind the tire rim terminal flange by withdrawing the cover periphery progressively therefrom. In applying the outer marginal portions of the metal cover members, engagement with the edge portion of the tire rim is attained by progressively sliding the rounded cover flange behind the edge of the tire rim, the last part of the trim member being inserted by transverse flexure thereof.

I claim as my invention:

1. In a wheel including a multi-flanged tire rim and a load sustaining body part, the tire rim having an extremity flange providing a generally radially inwardly opening groove, an annular cover for the tire rim and the juncture of the rim and body part and formed from resiliently deflectable material and having an outer circular margin turned generally axially inwardly for retainingly nesting within said tire rim groove, the body of the cover extending generally radially and axially inwardly to the body part, and means engaging the inner margin of the cover adjacent the body part for additionally retaining the cover on the wheel.

2. In a wheel structure including a tire rim and a central load bearing portion, an annular cover member arranged for disposition on the outer side of the tire rim substantially to conceal the same, said cover member including means at the outer peripheral edge thereof for detachably engaging the tire rim and having a substantially V-shaped, reinforcing cross sectional configuration at the radially inner margin thereof, and retaining means for attaching said inner peripheral margin of the cover member to the wheel structure including means arranged for attaching engagement to the wheel structure and a part arranged for abutting supporting engagement with the outer surface of the central load bearing portion of the wheel structure and terminating in a bead arranged for nested engagement within the V-shaped margin of the cover member.

3. In a cover structure for ornamentally concealing a tire rim and the juncture of the tire rim with a wheel body, a trim ring member, and a retaining ring member concealed behind the trim ring member, the inner margin of the trim ring member having a turned back generally axially inwardly and radially outwardly extending reinforcing flange and the retaining ring member having the inner marginal portion thereof internested within the groove provided by said turned back trim ring inner marginal flange, said retaining ring having means at the radially outer margin thereof for retaining engagement with the tire rim and having an intermediate portion extending angularly to said means and to the inner marginal portion of the retaining ring for abutment with the wheel body.

4. In a cover structure for ornamentally concealing a tire rim and the juncture of the tire rim with a wheel body, a trim ring member and a retaining ring member concealed behind the trim ring member, the inner margin of the trim ring member having a turned back generally axially inwardly and radially outwardly extending reinforcing flange and the retaining ring member having the inner marginal portion thereof internested within the groove provided by said turned back trim ring inner marginal flange, said retaining ring having a portion thereof extending angularly relative to said trim ring member for engagement with the wheel body and having the trim ring engaging marginal portion thereof offset generally axially outwardly from said body engaging portion.

5. In a cover structure for ornamentally concealing a tire rim and the juncture of the tire rim with a wheel body, a trim ring member and a retaining ring member concealed behind the trim ring member, the inner margin of the trim ring member having a turned back generally axially inwardly and radially outwardly extending reinforcing flange and the retaining ring member having the inner marginal portion thereof internested within the groove provided by said turned back trim ring inner marginal flange, said trim ring engaging portion of the retaining ring comprising a plurality of resilient fingers and the retaining ring being adapted to engage with the tire rim in a manner to place said fingers under tension for resiliently clamping the inner trim ring margin against the wheel body.

6. In combination in a cover assembly for a wheel including a tire rim and a wheel body, the cover assembly being dimensioned to substantially conceal the tire rim and the juncture of the tire rim with the wheel body, the cover assembly comprising a cover member formed from resiliently deflectable sheet material having an inner annular marginal underturned flange providing a generally radially outwardly opening groove, and a retaining ring member having an inner marginal portion interfitting within said groove to connect the trim ring and retaining ring into a unitary assembly, the trim ring being resiliently deflectable axially outwardly to swing open about the inner marginal juncture thereof with the retaining ring, the outer margin of the trim ring being turned under generally axially inwardly and radially inwardly and being adapted to fit internestingly within a radially inwardly opening groove in the terminal flange of the tire rim whereby the cover is adapted to be retained upon the wheel at both its inner and outer margins.

7. In combination in a wheel cover of the character described, an annular cover member, and means engaging the inner margin of the cover member for securing said inner margin in place on the outer side of a wheel structure including a wheel body and a tire rim having an outer terminal flange providing a radially inwardly opening groove, the outer margin of the cover member being formed with an axially inwardly curled flange formation for camming internested retaining relation within said tire rim flange groove.

8. In combination in a cover assembly for disposition in covering relation at the outer side of a vehicle wheel including a wheel body and a multi-flanged tire rim, a trim ring portion, and a retaining ring portion, said trim ring portion having an inner underturned marginal flange defining a generally radially outwardly opening groove, the retaining ring portion comprising a sheet metal member of a size to be concealed behind the trim ring portion and having a series of generally radially outwardly extending retaining fingers engageable with an intermediate flange of the tire rim, an intermediate annular portion of the retaining ring portion being disposed in generally the plane of the fingers and a radially inner marginal portion of the retaining ring extending angularly relative to the intermediate portion and engaging within the inner marginal groove of the trim ring.

9. The cover of claim 8 wherein the inner marginal portion of the retaining ring includes a bead-like formation engaging in the marginal groove of the trim ring.

10. A cover as defined in claim 8 wherein the inner marginal portion of the retaining ring extends flat at an oblique generally radially inward and axially outward angle and is arranged to press the marginal extremity of the trim ring against the wheel body.

11. The cover of claim 8 wherein the inner marginal portion of the retaining ring is in the form of a series of resilient angular, rounded retaining fingers engaging within the groove of the trim ring and adapted to press the engaged marginal extremity of the trim ring against the wheel body.

12. The cover of claim 8 wherein the inner margin of the retaining ring includes in addition a generally radially and axially inwardly extending extremity flange engaging generally edgewise of the groove of the trim ring margin and arranged to press the trim ring margin against the wheel body in assembly on the wheel.

GEORGE ALBERT LYON.

REFERENCES CITED

The following references are of record in the file of this patent:

UNITED STATES PATENTS

| Number | Name | Date |
|---|---|---|
| 1,855,022 | Kellogg | Apr. 19, 1932 |
| 1,948,273 | Lyon | Feb. 20, 1934 |
| 2,123,025 | Ramirez | July 5, 1938 |
| 2,212,038 | Lyon | Aug. 20, 1940 |
| 2,279,331 | Lyon | Apr. 14, 1942 |
| 2,345,283 | Mulhern | Mar. 28, 1944 |